United States Patent
Ryan et al.

(10) Patent No.: US 10,192,224 B1
(45) Date of Patent: Jan. 29, 2019

(54) METHOD AND DEVICE FOR COMMUNICATING TRANSACTIONAL DATA

(71) Applicant: NGE South, LLC, North Versailles, PA (US)

(72) Inventors: Thomas R. Ryan, North Huntingdon, PA (US); Nicholas M. Maurizi, Pittsburgh, PA (US)

(73) Assignee: NGE South, LLC, North Versailles, PA (US)

( * ) Notice: Subject to any disclaimer, the term of this patent is extended or adjusted under 35 U.S.C. 154(b) by 825 days.

(21) Appl. No.: 14/590,439

(22) Filed: Jan. 6, 2015

Related U.S. Application Data

(60) Provisional application No. 61/924,402, filed on Jan. 7, 2014.

(51) Int. Cl.
*G06Q 30/00* (2012.01)
*G07F 7/00* (2006.01)
*G06Q 30/06* (2012.01)
*G06Q 20/28* (2012.01)
*G07F 7/06* (2006.01)

(52) U.S. Cl.
CPC ......... *G06Q 30/0185* (2013.01); *G06Q 20/28* (2013.01); *G06Q 30/0601* (2013.01); *G06Q 30/0609* (2013.01); *G06Q 30/0619* (2013.01); *G07F 7/06* (2013.01)

(58) Field of Classification Search
CPC . G06Q 30/0185; G06Q 20/28; G06Q 30/0609
See application file for complete search history.

(56) References Cited

U.S. PATENT DOCUMENTS

| | | | | |
|---|---|---|---|---|
| 7,403,309 | B2 * | 7/2008 | Moncrieff | B44C 1/105 358/3.12 |
| 9,704,163 | B2 * | 7/2017 | Kasmai | G06Q 20/105 |
| 2012/0109787 | A1 * | 5/2012 | Larrick | G06Q 20/10 705/27.1 |
| 2013/0304620 | A1 * | 11/2013 | Bhattacharya | G06Q 40/04 705/37 |
| 2015/0278845 | A1 * | 10/2015 | Sorem | G06Q 30/0226 705/14.25 |

OTHER PUBLICATIONS

Hate your gift card? Swap to get one you really want. Blake Ellis, staff reporterDec. 28, 2010. (Year: 2010).*
Instant top up: The 'intelligent ATM machine' where you can cash in your old mobile ( . . . if you accept the price it offers you). By Eddie Wrenn for MailOnlinePublished: 08:59 EDT, Sep. 17, 2012 | Updated: 10:22 EDT, Sep. 17, 2012 (Year: 2012).*

\* cited by examiner

*Primary Examiner* — William J Allen
(74) *Attorney, Agent, or Firm* — The Webb Law Firm

(57) ABSTRACT

A method and system for communicating transactional data determines gift card data from a gift card offered for sale by a customer and customer information about the customer from an identity document of the customer. The gift card data is associated with the customer information. A balance of the gift card is determined based at least partly on the gift card data. A purchase offer for purchasing the gift card from the customer is calculated based at least partly on the balance. If the balance of the gift card changes, a fraud alert may be associated with the customer information of the customer.

50 Claims, 4 Drawing Sheets

US 10,192,224 B1

METHOD AND DEVICE FOR COMMUNICATING TRANSACTIONAL DATA

CROSS REFERENCE TO RELATED APPLICATIONS

This application claims the benefit of U.S. Provisional Application No. 61/924,402, filed Jan. 7, 2014.

BACKGROUND

Field

The present invention relates to gift card purchasing systems and methods and, in some embodiments, to systems and methods for automatically checking a gift card balance and preventing fraud.

Description of Related Art

The purchase and resale of secondhand gift cards is a growing market. Merchants or suppliers purchase gift cards from customers at a discount of face value and resell the cards through online market places. Approximately $100 billion in gift cards are bought each year. Approximately $20 billion of these cards go unused. Of this $20 billion, approximately $500 million are circulated through the secondhand market. This has created a compounding effect on the amount of untapped cards.

As the secondhand gift card market has grown, competition has driven up the payout percentages necessary to attract new customers and retain existing customers, which has led to a corresponding decrease in profit margins. As profit margins decrease, merchants may attempt to increase the volume of secondhand gift cards that they sell in order to maintain or increase their bottom line.

As the secondhand gift card industry increasingly becomes an exchange market place, the framework of which is already starting to develop within the online distribution models, profit margins may continue to decrease. Technology to combat this decrease in profit margins is needed for merchants to survive and/or emerge as the leaders of the secondhand gift card industry. Technology is needed to create the necessary efficiencies to maintain profitability with the continued squeeze on profit margins.

Conventionally, online merchants have issues with securing an uninterrupted supply of secondhand gift cards. Attracting tech savvy bargain shoppers to buy discounted gift cards is relatively easy, however, getting enough people to sell their unwanted gift cards to keep up with the demand of the online bargain shoppers is more difficult. Another pitfall associated with securing secondhand gift card supply via an online model is that customers have to mail their cards in and wait for a check. A lack of consumer confidence and the inability to instantly "cash out" deters customers from dropping their gift cards in the mail.

Accordingly, online marketplaces now secure the majority of their inventory from brick and mortar businesses that buy secondhand gift cards in a face-to-face setting and resell the cards to the online marketplaces. The symbiotic relationship of these two business models has led to a divide in the industry. The industry has essentially evolved into two niches—brick and mortar buyers and online distributors. However, a system is needed to bring consistency to secondhand suppliers while simultaneously streamlining operations and resolving industry pain-points.

Currently, the secondhand gift card industry revolves around the capturing, manipulation, and transmission of gift card data. Initially, distributors wanted the physical cards shipped to them before they would buy the cards from a supplier. Distributors may now buy the card data, only requiring receipt of the physical cards within a week or so of purchase. This transition has sped up supply chains on the distribution side and receivables on the supply side. A driving force behind this transition is the distributors' ability to convert gift card information into barcodes that may be emailed to customers for immediate use. The industry labels these e-cards. About 90% of all major retailer's gift cards can be converted into e-cards.

Retailers, however, have been resistant to the emergence of the secondhand gift card market. This is primarily due to the vast number of ways that gift cards may be fraudulently obtained. Although the retailers have the ability to adopt mitigation policies, they have been reluctant to do so. Retailers may often feel as if the policies allowing the fraud to occur are more beneficial than harmful—meaning the leakage they cause hasn't crossed their threshold of pain. Accordingly, technology to address fraud issues in the secondhand gift card market is needed.

The supply side of the secondhand gift card industry suffers from many pain-points. Issues include data capture, data manipulation/transmission, external fraud, internal fraud, card verification, and consumer experience at the point of sale.

Conventional systems do not allow gift card buyers to easily capture the necessary data from customers or gift cards. Conventionally, most data is captured through existing POS software through cumbersome work-a-rounds or via data entry into spreadsheets using programs like Microsoft® Excel. This leaves room for data entry errors and spreads data out over many files, which leads to work redundancies and increased staffing needs to manage the data.

Once the data is captured, it needs constant manipulation, which is performed manually by employees. The data needs to be prepped for sale to the distributors, reformatted for packing lists when physical cards need to be shipped, and compiled to log sales data. These are inefficient manual processes that add administrative cost, increase the chances for human error, and slow down workflow.

Transmitting data to distributors is also a manual process. Currently data is exported or compiled onto Microsoft® Excel spreadsheets, formatted, and emailed to distributors for sale. Conventionally, this is a daily process that is systemic, routinized, and timely, and that requires dedicated staff.

Fraud may be the largest problem associated with the secondhand gift card industry. External fraud is a constant threat to both customers and the retailers that issue the cards. Fraudsters may use stolen credit cards to purchase gift cards and sell the gift cards to a supplier. Once the credit card is reported stolen, the processor, e.g., Visa®, MasterCard®, American Express®, etc., contacts the retailers where the fraudulent transactions occurred. The retailer does everything in its power to mitigate the loss by securing inventory. In the case of gift cards, the retailer "secures" the card, or in other words, removes the value from the card. If this occurs before the fraudulently obtained gift card is sold and used, the card is worthless. At this point, the supplier who purchased the card is the only victim—money has been paid for a now worthless instrument with no way to collect.

Fraudsters sell cards to buyers and attempt to redeem the balance on the card that they sold. One way that fraudsters accomplish this is by logging the card number and PIN and using this data to make purchases through the issuing retailer's online stores. Another variation of this type of fraud occurs when a fraudster logs the card number and PIN and reports the gift card they sold as lost or stolen. The easiest way to accomplish this is to return the gift card to the issuing retailer's store and present the receipt generated when the card was issued. This type of fraud can be committed regardless of whether the gift card was obtained fraudulently. So again, the only victim is the buyer who put money out for the card.

Fraudsters also return stolen merchandise to receive in store credit stored on a gift card in exchange for the merchandise, and the fraudster may sell the card to a gift card buyer. If the retailer realizes the card was obtained through the exchange of stolen merchandise before the card is sold and used they zero the card's balance. Again, the gift card buyer is left holding the bag and is the only party involved at a loss. The retailer is made whole because they have the merchandise and they secured the card, which means no future merchandise is given in exchange for the gift card. The fraudster is in a better position because they have the cash given to them by the gift card buyer. Eliminating fraudsters enables suppliers to attract more customers and pay more competitive prices to customers for secondhand gift cards.

Verifying the balance of the gift card a buyer is purchasing may also create issues for merchants. The balance of most gift cards may be verified via the issuing retailer's website or by calling an automated 1-800 number dedicated to balance inquiries. These processes are cumbersome, leaving room for human error, and are time consuming. The net result is a longer transaction time and a negative effect on consumer experience. The result of the above-discussed issues is often times a painful experience for the honest customer. Transaction time may be upwards of 10 minutes, particularly if verification is difficult or nearly impossible.

The more difficult a particular brand of gift card is to verify, the more risk there is for the buyer. The buyer cannot confidently verify the balance, or at the very least may feel the balance is out-of-date. Because of the difficulty of verification of certain brands of gift cards, buyers are forced to pay less for these brands, if they purchase them at all. The net result is again a negative impact on customer experience. Customers may either not sell these cards because they feel they are not getting a good enough of a return, or feel as if the buyer is attempting to cheat them because they do not understand the dynamics underlying the payout. Either way a shadow is cast on the secondhand gift card industry.

SUMMARY

Preferred and non-limiting embodiments provide systems, methods, and devices that enable businesses or individuals, e.g., suppliers, to purchase and sell gift cards on the secondary gift card market, for example, as a supplemental business line. Preferred and non-limiting embodiments enable seamless purchase of gift cards, fraud avoidance, and automatic listing and selling on web-based secondary marketplaces.

Preferred and non-limiting embodiments or aspects of the present invention will now be described in the following numbered clauses:

Clause 1. A method for communicating data by a transactional device, the method including: determining, by a card reader, gift card data from a gift card offered for sale by a customer; determining, by the card reader, customer information about the customer from an identity document of the customer; associating, by the processor, the gift card data with the customer information; determining, by the processor, a balance of the gift card based at least partly on the gift card data; calculating, by the processor, a purchase offer for purchasing the gift card from the customer based at least partly on the balance; transmitting, by a transmitter, at least a portion of the gift card data to a secondary marketplace.

Clause 2. The method of clause 1, wherein the gift card data includes at least one of an issuer of the gift card, a unique account number of the gift card, and a PIN number of the gift card.

Clause 3. The method of any of clauses 1 and 2, wherein the determining the balance of the gift card includes accessing an external database storing the balance of the gift card.

Clause 4. The method of any of clauses 1-3, wherein the determining the balance of the gift card includes navigating to a web form and automatically populating a web form field with the gift card data.

Clause 5. The method of any of clauses 1-4, wherein the determining the balance of the gift card includes displaying, by a display, instructions to the customer for determining the balance of the gift card.

Clause 6. The method of any of clauses 1-5, wherein the card reader includes at least one of a magnetic strip reader, a barcode reader, and an optical character recognition (OCR) scanner.

Clause 7. The method of any of clauses 1-6, wherein the customer information includes at least one of a name of the customer, an address of the customer, an identification number of the customer, identifying information of the customer, and an image of the customer.

Clause 8. The method of any of clauses 1-7, further including: capturing, by a biometric reader, biometric information of the customer; and associating, by the processor, the biometric information with the gift card data and the customer information.

Clause 9. The method of any of clauses 1-8, further including: receiving, by the processor, a recommended purchase offer rate from a central control system, wherein the purchase offer is calculated based at least partly on the recommended purchase offer rate.

Clause 10. The method of any of clauses 1-9, wherein the purchase offer is calculated based at least partly on at least one of a purchase offer rate associated with the issuer of the gift card, a purchase offer rate associated with the individual gift card, and a purchase offer rate associated with the customer.

Clause 11. The method of any of clauses 1-10, further including: displaying, by a display, the purchase offer for the gift card to the customer.

Clause 12. The method of any of clauses 1-11, further including: receiving, by the processor, an acceptance of the purchase offer from the customer; and controlling, by the processor, payment to the customer of an amount of the purchase offer.

Clause 13. The method of clause 12, further including: generating, by the processor, a report to the customer including at least one of a name of a party purchasing the gift card, a time stamp of the payment, at least a portion of the customer information, at least a portion of the gift card data, and the amount of the purchase offer.

Clause 14. The method of any of clauses 12 and 13, further including: storing, by the processor, in a database at least one of a location of the payment, a time stamp of the payment, the customer information, an issuer of the gift card, the gift card data, an employee code of an employee associated with the payment, a face value of the gift card, and the amount of the purchase offer.

Clause 15. The method of any of clauses 12-14, further including: generating, by a label generator, a label for application to the gift card, the label including at least one of a location of the payment, a time stamp of the payment, the customer information, an issuer of the gift card, the gift card data, an employee code of an employee associated with the payment, a face value of the gift card, and the amount of the purchase offer.

Clause 16. The method of any of clauses 12-15, further including: determining, by the processor, after the payment to the customer, that the balance of the gift card has changed; and associating, by the processor, a fraud alert with the customer information of the customer.

Clause 17. The method of any of clauses 1-16, further including: receiving, by the processor, a fraud alert for the customer from an external party; and associating, by the processor, the fraud alert with the customer information of the customer.

Clause 18. The method of any of clauses 1-17, further including: calculating, by the processor, a sale price for selling the gift card to the secondary marketplace.

Clause 19. The method of clause 18, further including: receiving, by the processor, a recommended sale price from a central control system, wherein the sale price is calculated based at least partly on the recommended sale rate.

Clause 20. The method of any of clauses 18 and 19, wherein the sale price is calculated based at least partly on at least one of current market rates, a sale rate associated with the issuer of the gift card, a sale rate associated with an individual gift card, and sale rate associated with the secondary marketplace.

Clause 21. The method of any of clauses 1-20, further including: offering, by the processor, the gift card for sale to a plurality of different secondary marketplaces; receiving, by the processor, a sale price from at least a portion of the plurality of different secondary marketplaces; and selecting, by the processor, the secondary marketplace based at least partly on the sale price received from the at least a portion of the plurality of different secondary marketplaces.

Clause 22. The method of any of clauses 1-21, further including: receiving, by the processor, from the secondary marketplace, at least one of a sale price of the gift card, a sale rate of the gift card, a status of the gift card, a shipping cost associated with physical delivery of the gift card, a sale date of the gift card, a commission charge associated with a sale of the gift card, and a net payment expected from the sale of the gift card.

Clause 23. The method of any of clauses 1-22, further including: physically storing, by a compartment, the gift card.

Clause 24. The method of any of clauses 1-23, further including: generating, by the processor, a user customizable report capable of being organized by at least one of an issuer of the gift card, a unique account number of the gift card, a PIN number of the gift card, a name of the customer, an address of the customer, an identification number of the customer, identifying information of the customer, a balance of the gift card, a purchase offer price of the gift card, a purchase offer rate of the gift card, a sale price of the gift card, a sale rate of the gift card, a status of the gift card, a shipping cost associated with physical delivery of the gift card, a time stamp associated with a purchase or sale of the gift card.

Clause 25. The method of any of clauses 1-24, wherein the transmitting the at least a portion of the gift card data to the secondary marketplace includes navigating to a web form and automatically populating a web form field with the at least a portion of the gift card data.

Clause 26. The method of any of clauses 1-5, further including: storing, by the processor, a status of the card data and a status of a physical location of the gift card in a database.

Clause 27. A device for communicating transactional data, the device including: a card reader configured to determine gift card data from a gift card offered for sale by a customer and determine customer information about the customer from an identity document of the customer; a transmitter configured to transmit at least a portion of the gift card data to a secondary marketplace; and a non-transitory computer-readable storage medium in communication with a processor and having instructions stored thereon which, when executed by the processor, cause the processor to perform operations including: associating the gift card data with the customer information; determining a balance of the gift card based at least partly on the gift card data; and calculating a purchase offer for purchasing the gift card from the customer based at least partly on the balance.

Clause 28. The device of clause 27, wherein the gift card data includes at least one of an issuer of the gift card, a unique account number of the gift card, and a PIN number of the gift card.

Clause 29. The device of any of clauses 27 and 28, wherein the determining the balance of the gift card includes accessing an external database storing the balance of the gift card.

Clause 30. The device of any of clauses 27-29, wherein the determining the balance of the gift card includes navigating to a web form and automatically populating a web form field with the gift card data.

Clause 31. The device of any of clauses 27-30, further including: a display configured to display instructions to the customer for determining the balance of the gift card.

Clause 32. The device of any of clauses 27-31, wherein the card reader includes at least one of a magnetic strip reader, a barcode reader, and an optical character recognition (OCR) scanner.

Clause 33. The device of any of clauses 27-32, wherein the customer information includes at least one of a name of the customer, an address of the customer, an identification number of the customer, identifying information of the customer, and an image of the customer.

Clause 34. The device of any of clauses 27-33, further including: a biometric reader configured to capture biometric information of the customer, wherein the processor performs operations including: associating the biometric information with the gift card data and the customer information.

Clause 35. The device of any of clauses 27-34, wherein the processor performs operations including: receiving a recommended purchase offer rate from a central control system, wherein the purchase offer is calculated based at least partly on the recommended purchase offer rate.

Clause 36. The device of any of clauses 27-35, wherein the purchase offer is calculated based at least partly on at least one of a purchase offer rate associated with the issuer of the gift card, a purchase offer rate associated with the individual gift card, and a purchase offer rate associated with the customer.

Clause 37. The device of any of clauses 27-36, further including: a display configured to display the purchase offer for the gift card to the customer.

Clause 38. The device of any of clauses 27-37, wherein the processor performs operations including: receiving an acceptance of the purchase offer from the customer; and controlling payment to the customer of an amount of the purchase offer.

Clause 39. The device of clause 38, wherein the processor performs operations including: generating a report to the customer including at least one of a name of a party purchasing the gift card, a time stamp of the payment, at least a portion of the customer information, at least a portion of the gift card data, and the amount of the purchase offer.

Clause 40. The device of any of clauses 38 and 39, wherein the processor performs operations including: storing in a database at least one of a location of the payment, a time stamp of the payment, the customer information, an issuer of the gift card, the gift card data, an employee code of an employee associated with the payment, a face value of the gift card, and the amount of the purchase offer.

Clause 41. The device of any of clauses 38-40, further including: a label generator configured to generate a label for application to the gift card, the label including at least one of a location of the payment, a time stamp of the payment, the customer information, an issuer of the gift card, the gift card data, an employee code of an employee associated with the payment, a face value of the gift card, and the amount of the purchase offer.

Clause 42. The device of any of clauses 38-41, wherein the processor performs operations including: determining after the payment to the customer, that the balance of the gift card has changed; and associating a fraud alert with the customer information of the customer.

Clause 43. The device of any of clauses 27-42, wherein the processor performs operations including: receiving a fraud alert for the customer from an external party; and associating the fraud alert with the customer information of the customer.

Clause 44. The device of any of clauses 27-43, wherein the processor performs operations including: calculating a sale price for selling the gift card to the secondary marketplace.

Clause 45. The device of clause 44, wherein the processor performs operations including: receiving, by the processor, a recommended sale price from a central control system, wherein the sale price is calculated based at least partly on the recommended sale rate.

Clause 46. The device of any of clauses 44 and 45, wherein the sale price is calculated based at least partly on at least one of current market rates, a sale rate associated with the issuer of the gift card, a sale rate associated with an individual gift card, and sale rate associated with the secondary marketplace.

Clause 47. The device of any of clauses 27-46, wherein the processor performs operations including: offering the gift card for sale to a plurality of different secondary marketplaces; receiving a sale price from at least a portion of the plurality of different secondary marketplaces; and selecting the secondary marketplace based at least partly on the sale price received from the at least a portion of the plurality of different secondary marketplaces.

Clause 48. the device of any of clauses 27-47, wherein the processor performs operations including: receiving from the secondary marketplace, at least one of a sale price of the gift card, a sale rate of the gift card, a status of the gift card, a shipping cost associated with physical delivery of the gift card, a sale date of the gift card, a commission charge associated with a sale of the gift card, and a net payment expected from the sale of the gift card.

Clause 49. The device of any of clauses 27-48, further including: a storage compartment configured to store the gift card.

Clause 50. The device of any of clauses 27-49, wherein the processor performs operations including: generating a user customizable report capable of being organized by at least one of an issuer of the gift card, a unique account number of the gift card, a PIN number of the gift card, a name of the customer, an address of the customer, an identification number of the customer, identifying information of the customer, a balance of the gift card, a purchase offer price of the gift card, a purchase offer rate of the gift card, a sale price of the gift card, a sale rate of the gift card, a status of the gift card, a shipping cost associated with physical delivery of the gift card, a time stamp associated with a purchase or sale of the gift card.

Clause 51. The device of any of clauses 27-50, wherein the processor performs operations including: controlling the transmitter to navigate to a web form and automatically populate a web form field with the at least a portion of the gift card data to transmit the at least a portion of the gift card data to the secondary marketplace.

Clause 52. The device of any of clauses 27-51, wherein the processor performs operations including: storing a status of the card data and a status of a physical location of the gift card in a database.

Clause 53. The device of any of clauses 27-52, including a stationary unit for placement at a permanent location, the stationary unit including a communications interface configured to communicate with a central control system.

Clause 54. The device of any of clauses 27-53, including a mobile phone.

Clause 55. A system for purchasing gift cards, the system including: a plurality of the device of any of clauses 27-54; and a central control server configured to control communications between the plurality of the device of clauses 27-54.

Clause 56. A device for performing the method of any of clauses 1-27.

Clause 57. A method for purchasing gift cards which includes utilizing the device of any of clauses 27-54.

Clause 58. A method for detecting fraudulent communications by a transactional device, the method including: determining, by a card reader, gift card data from a gift card offered for sale by a customer; determining, by the card reader, customer information about the customer from an identity document of the customer; associating, by a processor, the gift card data with the customer information; determining, by the processor, a balance of the gift card at an initial point in time based at least partly on the gift card data; calculating, by the processor, a purchase offer for purchasing the gift card from the customer based at least partly on the balance; determining, by the processor, the balance of the gift card at a subsequent point in time; comparing, by the processor, the balance of the gift card at the initial point in time to the balance of the gift card at the subsequent point in time; and associating, by the processor, a fraud alert with the customer information of the customer if the balance of the gift card at the initial point in time is different than the balance of the gift card at the subsequent point in time.

Clause 59. A transactional device for detecting fraudulent communications, the device including: a card reader configured to determine gift card data from a gift card offered for sale by a customer and determine customer information about the customer from an identity document of the customer; a non-transitory computer-readable storage medium in communication with a processor and having instructions stored thereon which, when executed by the processor, cause the processor to perform operations including: associating the gift card data with the customer information; determining a balance of the gift card at an initial point in time based at least partly on the gift card data; calculating a purchase offer for purchasing the gift card from the customer based at least partly on the balance; determining the balance of the gift card at a subsequent point in time; comparing the balance of the gift card at the initial point in time to the balance of the gift card at the subsequent point in time; and associating a fraud alert with the customer information of the customer if the balance of the gift card at the initial point in time is different than the balance of the gift card at the subsequent point in time.

BRIEF DESCRIPTION OF THE DRAWINGS

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF PREFERRED EMBODIMENTS

Figure 1:
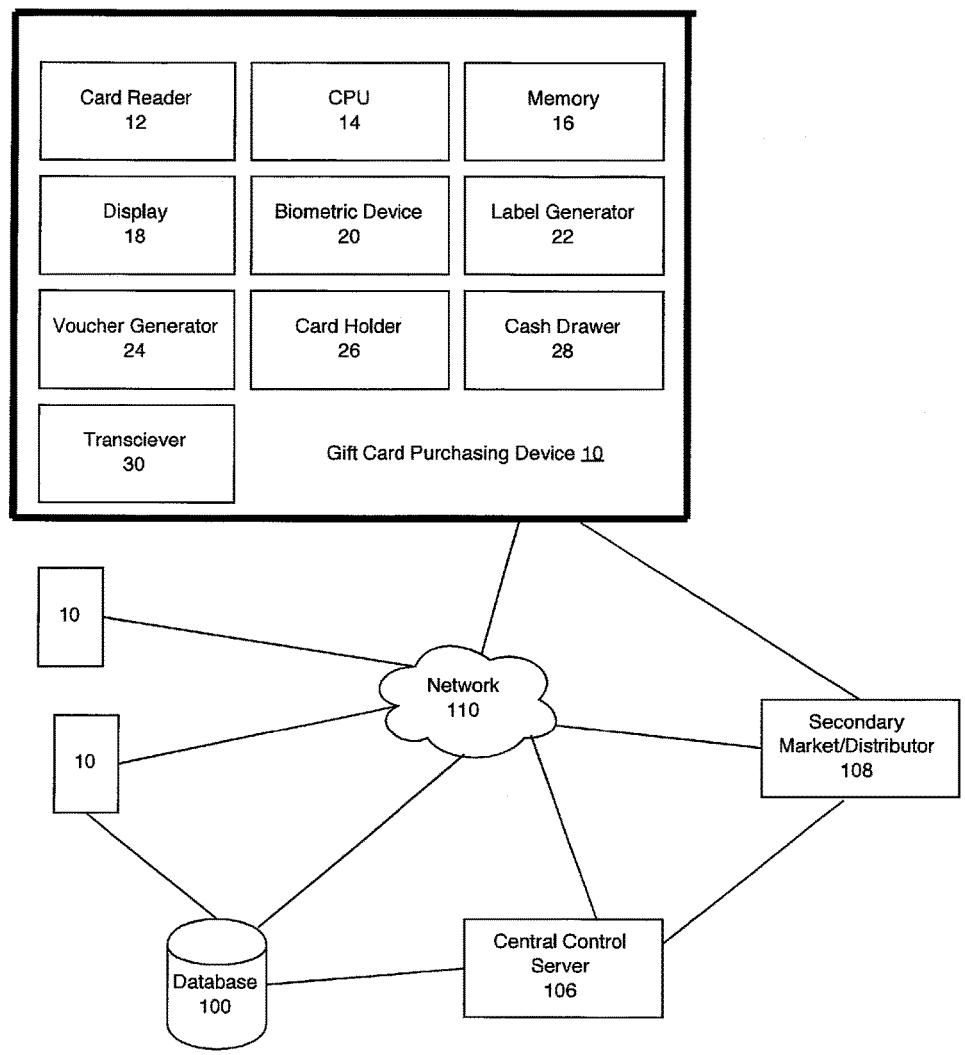
FIG. 1 is a block diagram of a system for purchasing gift cards according to a preferred and non-limiting embodiment.

As used herein, the singular form of "a", "an", and "the" include plural referents unless the context clearly dictates otherwise.

As used herein, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention can assume various alternative orientations and, accordingly, such terms are not to be considered as limiting. Also, it is to be understood that the invention may assume various alternative variations and stage sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This may refer to a direct or indirect connection that may be wired and/or wireless in nature. Additionally, two units or components may be in communication with each other even though the data transmitted may be modified, processed, routed, and the like, between the first and second unit or component. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

A system for buying and selling gift cards may include one or more gift card purchasing devices 10, a database 100, a central control server 106, one or more secondary markets or distributors 108, and/or network 110.

The one or more gift card purchasing devices 10 may communicate with the central control server 106 via the network 110. The network 110 may include the Internet, one or more intranets, cellular data networks, and/or other data communications networks. The central control server 106 may communicate data between a plurality of different gift card purchasing devices 10, the database 100, and/or the one or more secondary market places or distributors 108. The one or more gift card purchasing devices 10 may directly store data in the database 100 or store data in the database 100 via the central control server 106. The data in the database 100 may be stored as cloud based spreadsheets and may be hosted, for example, by Amazon® Web Services or Google®.

A secondary gift card marketplace or distributor 108 may include a system configured to receive gift card data and offer the gift card data for sale. For example, the secondary gift card marketplace 108 may include a web interface configured to receive the gift card data and offer the gift card for sale via a website. Examples of known secondary gift card marketplaces include cardcash.com, abcgiftcards.com, and raise.com.

A gift card purchasing device 10 may include card reader 12, processor 14, a memory 16, a display 18, a biometric device 20, a label generator 22, a voucher generator 24, a card holder 26, a cash drawer 28, and/or a communications transceiver 30. The gift card purchasing device 10 may include any suitable computer including a processor and memory that is capable of being configured to perform functions or features of the gift card purchasing device 10 described herein. The gift card purchasing device 10 may include a computer readable medium, e.g., memory 16, including program instructions for instructing the processor 14 to perform functions or features of the gift card purchasing device 10 described herein. The display 18 may include a touch screen display configured to display output to customers and/or employees and receive input from the customers and/or employees.

The card reader 12 is configured to read data from gift cards and/or identity documents of customers. The card reader 12 may include a magnetic strip reader, a barcode reader, an optical character recognition (OCR) scanner, and/or any other device or scanner capable of determining information from a gift card and/or identity document. Information from the gift card and identity document may be instantly captured instead of being manually keyed in by an employee, thereby eliminating human error during data entry and drastically reducing transaction time. By streamlining data input, transaction time may be drastically reduced while simultaneously creating a more professional "feel" to present to customers. An industry specific system adds legitimacy and boosts consumer confidence.

A process by which the information is gathered by the card reader 12 and interpreted by the gift card purchasing device 10 may be unique to each brand of gift card. Each gift card issuer may have their own "code" by which the gift card data is scrambled. Accordingly, the gift card purchasing device 10 may include algorithms tailored to systematically "unlocking" or decoding each brand of gift card from the different issuers so that the gift card data may be seamlessly gathered.

The biometric device 20 is configured to determine biometric information of customers. The biometric device may include a finger print scanner, an ocular scanner, a facial recognition scanner, and/or any other biometric device capable of determining biometric information for identifying a person. The biometric information gathered by the biometric device 20 may be used to authorize access to the gift card purchasing device 10 to customers and/or employees.

The label generator 22 and the voucher generator 24 may be integrated together as a single device or include separate devices. The label generator 22 is configured to generate a label for application to a gift card. The label may include a printed label, such as, a bar code, an RFID tag, and/or any other label capable of being used to identify and track the gift card. The voucher generator 24 is configured to generate a voucher for a customer including transactional information regarding a gift card purchase from the customer. The voucher may include a printed sheet, an email, or any other medium capable of storing transactional information to be transferred to the customer.

The card holder 26 is configured to securely store one or more physical gift cards after the gift cards are purchased from a customer. For example, the card holder 26 may require the customer to place the physical gift card in an open receptacle in order to complete a transaction. The gift card purchasing device 10 may verify that the physical gift card corresponds to card data from the transaction, and the card holder 26 may secure the card in a secure receptacle that is inaccessible by the customer. For example, the card holder 26 may include features similar to well-known automatic teller machines (ATM) mechanisms configured to receive bank cards and/or checks from a user and securely store the bank cards and/or checks.

The cash drawer 28 is configured to store cash, determine an amount of cash to be paid to the customer for a transaction, and/or dispense the determined amount of cash to the customer as payment for a gift card purchased from the customer.

The communication transceiver 30 may include a wired or wireless transceiver for communicating with the central control server 106 and/or the database 100, for example, a Wi-Fi transceiver, a cellular data transceiver, a wired Ethernet card, and/or other data communications transceiver capable of communicating via network 110 or directly with the database 100 and/or that central control server 106.

Figure 2A:
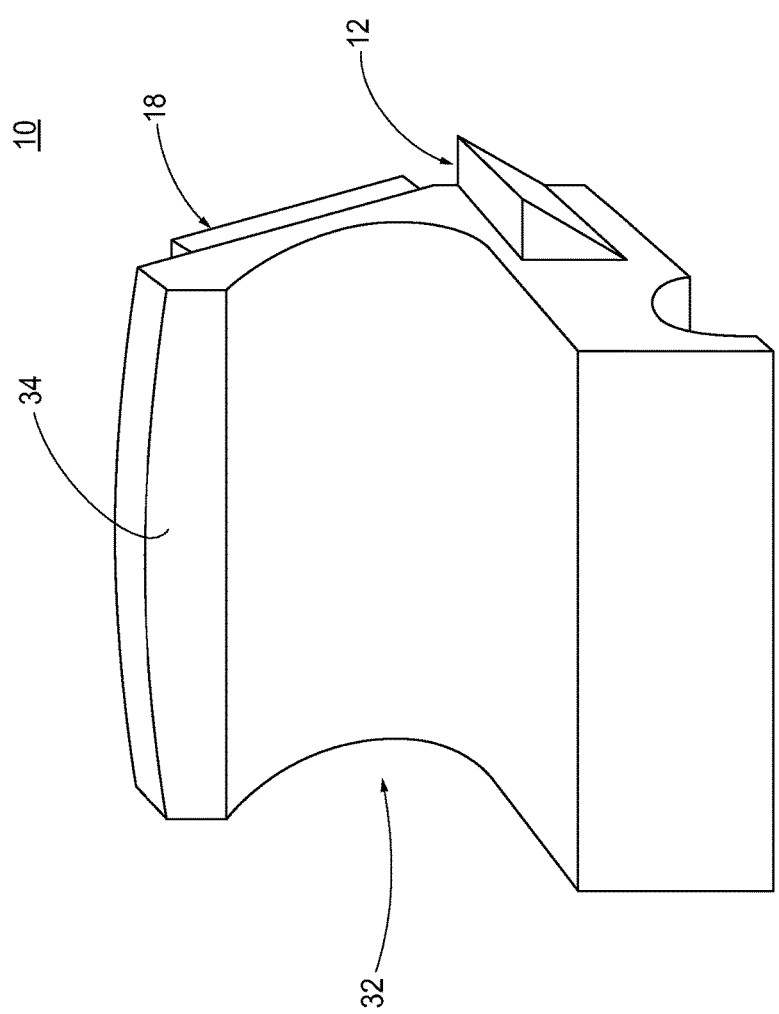
FIGS. 2A and 2B illustrate an example counter top computer system including hardware and software components that automate a gift card purchasing process according to preferred and non-limiting embodiments.
Figure 2B:
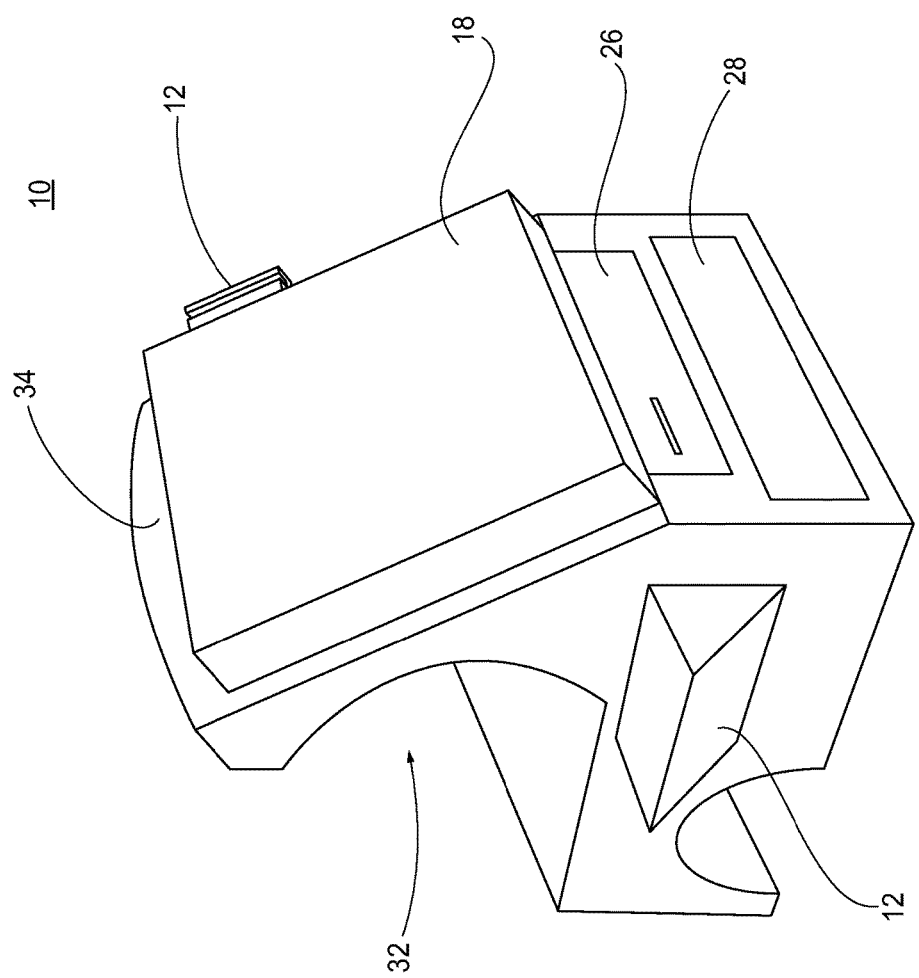

In one aspect or embodiment, the gift card purchasing device 10 includes a stationary device, for example, a counter top computer system including hardware and software components that automate the gift card purchasing process. FIGS. 2A and 2B illustrate example counter top computer systems including hardware and software components that automate a gift card purchasing process according to preferred and non-limiting embodiments. The hardware may be contained in a unique, stylized housing unit 32 that makes the device 10 recognizable to the public and allows branding of the device 10. For example, the gift card purchasing device may include a Windows based PC for running software and integrating other hardware components including the display 18, e.g., a flat LED screen, the card reader 12, e.g., a card reader for capturing data from magnetic strips or barcodes of gift cards and identity documents and/or an optical character recognition (OCR) scanner, a biometric device 20 (FIG. 1), such as a finger print scanner, a voucher generator 24 (FIG. 1), e.g., a receipt printer for voucher print outs, an integrated cash drawer 28, a card holder 26, e.g., a small two compartment security safe, a label generator 22 (FIG. 1), e.g., a printer for printing labels for gift cards, and/or stylized housing for the components, e.g., a logo 34 or other stylized design.

In one aspect or embodiment, the gift card purchasing device 10 may include a "dummy" terminal that is controlled by the central control server 106. The central control server 100 may store and/or execute software for controlling the gift card purchasing device 10 remotely via the network 110. For example, the central control server 106 may host one or more applications for controlling the devices 10 and store the data therefrom at a central location in the database 100, for example, at an Amazon® Web Services server. Alternatively, the gift card purchasing device 10 may store and/or execute some or all of the software components or modules for performing the functions described herein and/or communicate with the central control server 106 and/or other devices 10 via the central control server 106. The central control server 106 may synchronize data among a plurality of different gift card purchasing devices 10. For example, gift card data and customer information received by a first device 10 may be accessible to the other devices 10 in communication with the central control server 106 and stored in a central location in a standardized format for all of the devices 10.

The gift card purchasing device 10 and/or the central server 106 may store and/or execute software or modules for creating, accessing, and/or controlling one or more databases for storing card data including purchase data and sales data, databases for storing customer information, basic point of sale functions, cash management, receiving voucher generation, reporting modules, shipping creation modules, graphic interfaces, software for capturing card data from magnetic strip on gift card, and/or software for capturing customer info from customer IDs. For example, the gift card purchasing device 10 and/or the central server 106 may store and/or execute software components or modules for automatically verifying gift card balances via a retailer's web interface, automatically listing gift cards on one or more secondary gift card marketplaces' websites, retrieving gift card sales data in real-time and updating corresponding databases, tracking sales rates of gift cards on the one or more secondary marketplaces, calculating recommended sales rates and sending updates to devices 10 in the field, computing recommended purchase rates based on purchase rate data, sales data, and/or geographic competition, and/or prompting a user with information required to manually check outlier gift cards to the system.

In one aspect or embodiment, the gift card purchasing device 10 includes a mobile device, for example, a smart phone, a tablet, such as, an iPad®, or any other mobile computing device capable of being configured to perform functions or features of the gift card purchasing device 10 described herein. It will be recognized, of course, that not all of the functions of the gift card purchasing device 10 need be included in such a mobile device or other aspects or embodiments, for example, the card holder 26 and/or cash drawer 28 may not be desirable or feasible features or modifications for a smart phone based gift card purchasing device 10.

Figure 3:
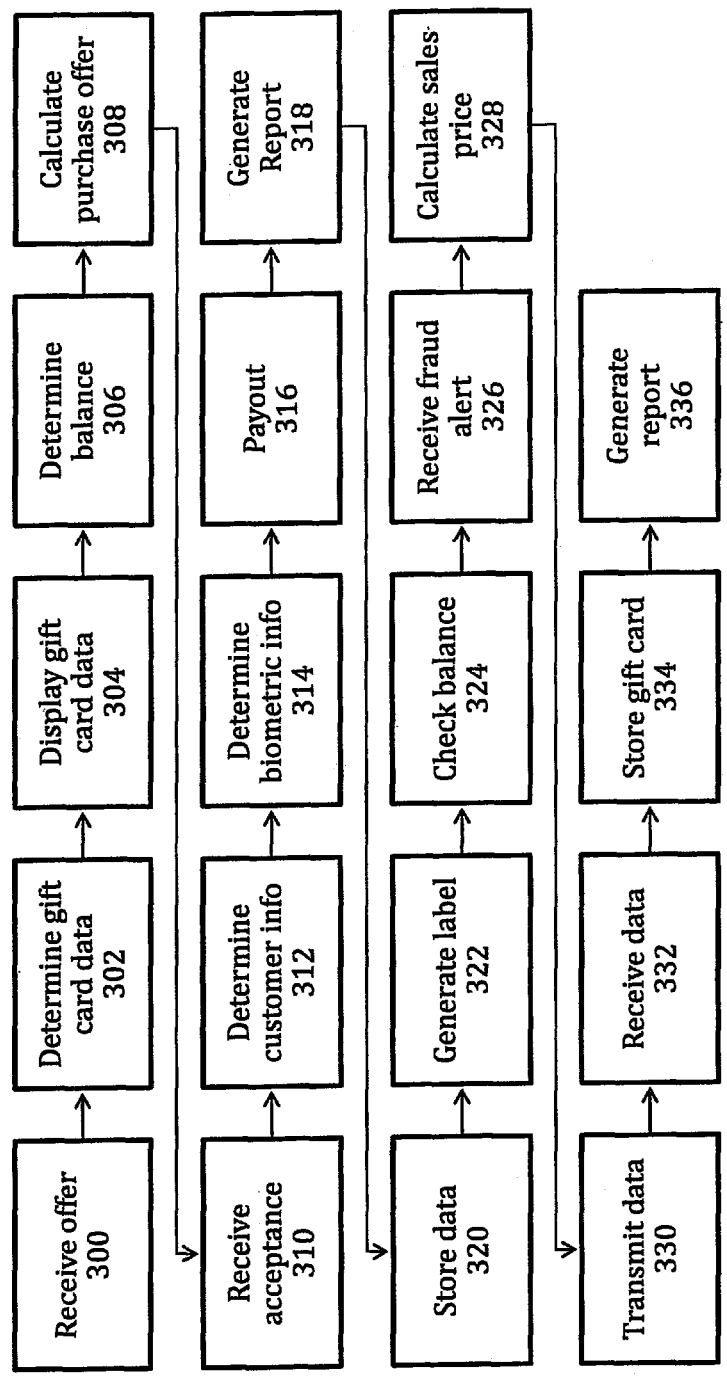
FIG. 3 is a flow chart of a method for purchasing gift cards according to a preferred and non-limiting embodiment.

FIG. 3 is a flow chart of a method for purchasing gift cards according to a preferred and non-limiting embodiment. At stage 300, the gift card purchasing device 10 receives an offer to buy a gift card from a customer. For example, a customer may approach a merchant who owns the device 10 and make an offer to sell a gift card on the device 10. Alternatively, the customer may make the offer to sell the gift card via their smart phone or tablet, which is configured as a gift card purchasing device 10. For example, the customer may install an application on the smartphone that configures the smart phone to function as a gift card purchasing device 10, and the customer may add one or more peripheral devices to the smartphone, e.g., a card reader 12, etc., to enable one or more feature or functions of the gift card purchasing device 10. In one aspect or embodiment, a camera of the smart phone may be used as the card reader 10. Although aspects and embodiments are generally described with respect to a single gift card in a transaction, it will be recognized that multiple gift cards may be involved in a single transaction with a customer.

At stage 302, the card reader 12 of the gift card purchasing device 10 determines gift card data from the gift card offered for sale by the customer. For example, if the gift card includes a magnetic strip, the merchant may take the gift card from the customer and swipe the gift card through an integrated card-reader 12 of the gift card purchasing device to read the magnetic strip. The card reader 12 may include an optical character recognition scanner (OCR) configured to scan the gift card and determine the gift card data from an image of the scanned gift card. The card reader 12 may include a barcode reader, an RFID detector, or any other device configured for a particular data storage format of a gift card to determine the gift card data. The card reader 12 may determine an issuer of the gift card, a unique account number of the gift card, and/or a PIN number of the gift card.

At stage 304, the gift card purchasing device 10 may display the gift card data on the display 18. For example, the processor 14 may automatically populate corresponding data fields visible on the display 18 of the device 10.

At stage 306, the gift card purchasing device 10 determines a balance of the gift card based at least partly on the gift card data. In one aspect or embodiment, the gift card purchasing device 10 may access, e.g., directly access, an external database, e.g., an external database of the issuer of the gift card, that stores the balance of the gift card to determine the balance of the gift card. In another aspect or embodiment, the gift card purchasing device 10 may navigate to a web form or interface, e.g., a web page of the issuer of the gift card, and automatically populate fields of the web form with the gift card data and submit the web form to receive the balance of the gift card in response to the submission of the web form. For example, the gift card purchasing device 10 may automatically transmit via the network 110 the gift card data to a web page based balance checker provided by the issuer of the gift card. The gift card purchasing device 10 automatically populates required data fields with the gift card data, submits the data, and receives a response from the web interface. The device 10 may be configured to overcome security features, such as, Captcha®, in order to submit the data via the web form. Alternatively, the device 10 may instruction a human monitor, such as, the employee, to overcome the Captcha®.

In still another aspect or embodiment, the gift card purchasing device 10 may display on the display 18 instructions to the customer or employee for determining the balance of the gift card. For example, the customer or merchant is prompted with appropriate information via the display 18, e.g., one or more web pages and/or instructions, to manually check the balance. The display 18 may display the balance of the gift card.

At stage 308, the gift card purchasing device 10 calculates a purchase offer for purchasing the gift card from the customer based at least partly on the balance and displays the offer to the customer on the display 18. The gift card purchasing device 10 may calculate the purchase offer based on a percentage of the balance on the card and/or a current market rate for gift cards from the particular issuer or brand of the gift card. The gift card purchasing device 10 may receive a recommended purchase offer rate or percentage from the central control server 106 and calculate the purchase offer based on the recommended purchase offer rate. For example, recommended purchase offer rates or percentages may be distributed by the central control server 106 to devices 10 of merchants and/or individuals through updates provided via the network 110.

A merchant or individual controlling the gift card purchasing device 10 may modify recommended purchase offer rates or percentages to set a desired purchase offer rate or percentage. The gift card purchasing device may calculate the purchase offer based on a purchase offer rate associated with the issuer or brand of the gift card, a purchase offer rate associated with the individual gift card itself, and/or a purchase offer rate associated with the particular customer. For example, the merchant or individual may modify or override recommended payout percentages to determine his own profit margin per brand of gift card. This provides the merchant with the flexibility to be more or less competitive with payout rates on a brand-by-brand basis. Rates may be set on a system wide basis for each gift card, for example, the rate for each brand of gift card may be set by an authorized user at the central control server 106 such that it cannot be overridden at the point of transaction, e.g., at a particular device 10. Alternatively, rates may be set on a tiered payout system, for example, a variety of rates may be paid for each brand of gift card, and each rate is displayed at the point and time that a device 10 makes a purchase offer to provide the merchant or individual the ability to negotiate higher or lower payouts on a transaction-by-transaction and card-by-card basis.

At stage 310, the gift card purchasing device 10 receives an acceptance of the purchase offer from the customer. For example, the customer may indicate his acceptance via a touch screen interface of the display 18, inserting the gift card into the card holder 26, or simply by proceeding to a next instructed stage in the purchasing process. Alternatively, the customer may decide not to accept the purchase offer, and processing may return to stage 300 to receive a new offer from a customer.

At stage 312, the card reader 12 of the gift card purchasing device 10 determines customer information about the customer from an identity document of the customer. For example, if the identity document includes a magnetic strip, the merchant may take the identity document from the customer and swipe the identity document through a card-reader 12 of the gift card purchasing device 10 to read the customer information from the magnetic strip. The card reader 12 may include an optical character recognition scanner (OCR) configured to scan the identity document and determine the customer information from an image of the scanned identity document. The card reader 12 may include a barcode reader, an RFID detector, and/or any other device configured for a particular data storage format of the identity document to determine the customer information. The identity document is preferably a Government Issued ID, preferably a photo ID, such as, a driver's license, a military ID, a passport, etc. The customer information may include a name of the customer, an address of the customer, an identification number of the customer, e.g., a driver's license number or a passport number, and/or identifying information of the customer, e.g., hair or eye color, and an image of the customer, e.g., if the identity document contains a photo.

Although stage 312 is discussed after stages 300 to 310 of the gift card purchasing method, aspects and embodiments are not limited thereto, and the customer information determined in stage 312 may be determined at any earlier time in the process, for example, before stage 306 in which the balance is determined, so that the balance may be calculated by the device 10 based at least partly on the customer information. The gift card purchasing device 10 may store the customer information in the memory 16 and/or the database 100 in association with the gift card data. For example, the customer information may be stored in the database 100 such that customer activity may be tracked and a repeat customer's information may be quickly retrieved. In one aspect or embodiment, the customer information may be required to be authorized before a customer is granted access the gift card purchasing device 10, e.g., to make an offer to sell a gift card at the device 10.

Additionally, or alternatively, to stage 312, at stage 314 the biometric device 20 may determine biometric information of the customer. The gift card purchasing device 10 may store the biometric information in the memory 16 and/or the database 100 in association with the gift card data and the customer information. For example, the biometric reader may capture and store an image of a customer's fingerprint during a first transaction. This unique identifying biometric information may be used to access and recall customer account information without the necessity of rescanning a customer's identity document, and/or may be used to protect each customer account by preventing unauthorized access to the customer information and/or the device 10. In one aspect or embodiment, the biometric information may be required to be authorized before a customer is granted access the gift card purchasing device 10, e.g., to make an offer to sell a gift card at the device 10.

At stage 316, the gift card purchasing device 10 may finalize the transaction for purchasing the gift card from the customer and pay the amount of the purchase offer to the customer. The cash drawer 28 may be configured to automatically dispense the amount of the purchase offer to the customer in cash. Alternatively, the device 10 may indicate to the merchant the amount of the purchase offer to pay to the customer from the merchant's cash drawer. Accordingly, the merchant may use his existing point of sale system (POS) to track the cash for the payouts of purchased gift cards or the system of the device 10 to track the cash payouts. This may be the merchant's preference based on the merchant's existing accounting system. Alternatively, the gift card purchase device 10 may automatically fund an account associated with the customer, for example, by accessing a bank associated with the account via the network 110. Bank account information may be stored in association with the customer information in the database 100. In another aspect or embodiment, the device 10 may issue the customer another gift card including a balance corresponding to the amount of the purchase offer. For example, the customer may desire to sell gift cards from a first issuer and receive payment in the form of gift cards from one or more different second issuers.

At stage 318, after the transaction has been finalized and the payment made to the customer, the voucher generator 24 may generate a report including transaction information associated with the transaction. The report may include a printed voucher, such as a paper receipt, an email, or other document capable of conveying the transaction information. The transaction information may include a name of a party, e.g., merchant or supplier, purchasing the gift card, a time stamp of the payment, at least a portion of the customer information, at least a portion of the gift card data, e.g., issuer of the gift card, the last four digits of the card number (the full card number may be protected to prevent fraud), and/or a balance on the card, the amount of the purchase offer, and/or a total amount paid to the customer for all cards included in the transaction.

At stage 320, the gift card purchasing device 10 stores the gift card data, the customer information, the biometric information, and/or the transaction information in association with each other in the memory 16 and/or the database 100. For example, the gift card purchasing device 10 may store a location of the payment, a time stamp of the payment, the customer information, an issuer of the gift card, the gift card data, an employee code of an employee associated with the payment, a face value of the gift card, and/or the amount of the purchase offer in the database 100.

At stage 322, the label generator 22 may generate a label for application to the gift card. The label may include a barcode, a RFID tag, or any other label capable of storing some or all of the gift card data, the customer information, the biometric information, and/or the transaction information. For example, the data may be captured in a barcode label printed upon completion of the transaction, and a bar code label may be printed for each card purchased and applied to the corresponding card by the gift card purchasing device. The label may store a location of the payment, a time stamp of the payment, the customer information, an issuer of the gift card, the gift card data, an employee code of an employee associated with the payment, a face value of the gift card, and/or the amount of the purchase offer. Accordingly, the merchant or individual, the supplier, or the secondary gift card marketplace 108 may scan a label of a gift card and retrieve all relevant data therefrom, thereby streamlining their inventory management processes.

At stage 324, at any time after the balance for the gift card has been determined, the gift card purchasing device 10 may check the balance of the gift card, for example, as described above with respect to stage 306. This process may be automated by the gift card purchasing device 10 and repeatedly or constantly check the balance of the gift card at predetermined time intervals. The gift card purchasing device 10 may determine if the balance of the gift card has changed from the initially determined balance, for example, a balance used to determine the purchase offer. If the balance has changed, the gift card purchasing device 10 may issue a fraud alert for the gift card and the customer that sold the gift card. For example, the gift card purchasing device 10 may store a fraud alert in association with the customer information and/or the gift card information in the database 100. Fraud alerts may be perpetuated throughout a system of a plurality of different gift card purchasing devices 10 by the central control server 106. Accordingly, if a customer associated with a fraud alert in the system attempts to sell a gift card at any of the devices 10, the device 10 may deny the customer access.

For example, a next time the customer's ID or biometric information is used to access the device 10, service may be denied unless collection is agreed to. If the fraudster refuses repayment, they may be permanently banned across the entire system, i.e., banned from using any of the devices 10 in the system or in communication with the system. Depending on preset thresholds in the central control server 106 or at an individual device 10, a report or email may be generated to inform management that certain offenders have met the criteria to be pursued criminally and/or the system may automatically transmit information on the fraudsters to a law enforcement agency.

At stage 326, at any time during the gift card purchasing process, the gift card purchasing device 10 may receive a fraud alert for a customer, e.g., from an external party, and store the fraud alert in association with customer information of the customer in the database 110. For example, the gift card purchasing device 10 may receive a fraud alert from an issuer of the gift card, a secondary marketplace or distributer 108, a law enforcement agency, etc. The fraud alert may be transmitted to the device 10 in a similar manner as the sales data described below. Prompt fraud detection improves combating fraud. Gift card buyers may not react to fraud until they know the fraud has occurred. Fraud detection is a useful tool for alleviating fraud. At stage 326, in another aspect or embodiment, the device 10 may prompt employees to verify the balances of a previous day's gift card purchases, for example, at the beginning of the following workday.

At stage 328, the gift card purchasing device 10 may calculate a sale price for selling the gift card to the secondary marketplace 108. The gift card purchasing device 10 may calculate the sale price based on a percentage of the balance on the card. The gift card purchasing device 10 may receive a recommended sale rate or percentage from the central control server 106 and calculate the sale rate based on the recommended sale rate. For example, recommended sale rates or percentages may be distributed by the central control server 106 to devices 10 of merchants and/or individual through frequent updates provided via the network 110. The central control server 106 may calculate the recommended sale rates or percentages for particular brands of gift cards based on current market conditions, e.g., an amount purchasers on the secondary market are willing to pay for a particular brand and how fast the particular brand sells on the secondary market.

A merchant or individual controlling the gift card purchasing device 10 may modify recommended sale rates or percentages to set a desired sale rate or percentage. The sale price may be calculated based on a sale rate associated with the issuer of the gift card, a sale rate associated with the individual gift card itself, and/or a sale rate associated with the particular customer. For example, the merchant or individual may modify or override recommended sale price percentages to determine his own profit margin per brand of gift card. This provides the merchant with the flexibility to be more or less competitive with sale rates on a brand-by-brand basis in the secondary market. Sale rates may be set on a system wide basis for each card, for example, the sale rate for each brand of gift card is set by an authorized user such that the sale rate cannot be overridden at a particular device 10. Alternatively, rates may be set on a tiered payout system, for example, a variety of rates may be paid for each brand of gift card. This provides the merchant or individual the ability to negotiate higher or lower sales on a transaction-by-transaction and card-by-card basis.

In another aspect or embodiment, the gift card purchasing device 10, at stage 328, may offer a gift card for sale to a plurality of different secondary marketplaces, receive a sale price from at least a portion of the plurality of different secondary marketplaces, and select a secondary marketplace to which the gift card is offered for sale marketplace based on the sale price received from the at least a portion of the plurality of different secondary marketplaces. For example, the device 10 may interact directly with distributors' software through APIs and list the gift card data for sale without human interaction to shop a plurality of distributors and list on the distributor's site that pays the most on a brand-by-brand basis to ensure maximized returns. The device 10 may use the APIs to shop each of the plurality of different secondary marketplaces and select the marketplace with the best sale price or sale rate.

At stage 330, the gift card purchasing device 10 may transmit the gift card data to a secondary marketplace or distributor 108. The gift card data may be transmitted to the secondary marketplace in a similar manner as the process described above with respect to stage 306 to verify the balance of the gift card. In one aspect or embodiment, the gift card purchasing device 10 may have direct access to an external database of the secondary marketplace or distributor 108 that enables the device 10 to upload and update sales listings on a website of the secondary marketplace or distributor 108 with the gift card data. In another aspect or embodiment, the gift card purchasing device 10 may navigate to a web form, e.g., a web page of the secondary marketplace, and automatically populate fields of the web form with the gift card data and submit the web form to list the gift card for sale by the secondary marketplace or distributor 108. The gift card purchasing device 10 automatically populates required data fields with the gift card data, submits the data, and receives a response from the web interface confirming that the gift card data was uploaded without error. In still another aspect or embodiment, the gift card purchasing device 10 may display on the display 18 instructions to the employee for listing or transmitting the gift card data to the secondary marketplace or distributor 108 to list the gift card for sale. For example, the customer or merchant is prompted with appropriate information via the display 18, e.g., via one or more web pages and/or instructions, to manually transmit the gift card data. The display 18 may display a confirmation that the gift card data has been transmitted to the secondary marketplace 108 without error.

It is noted that the gift card purchasing system 10 need not transmit or upload the gift card data for a card at the completion of a transaction purchasing the card from a customer. The gift card data may be uploaded at any time after the completion of the transaction. The device 10 and the database 100 may enable the merchant or individual to separately access and view the data from cards not yet uploaded (not listed) and provide the ability to upload individual gift cards or batches of gift cards to the secondary marketplace 108. This gives the merchant the flexibility to list certain cards and to redeem certain cards for him/herself.

After a gift card is listed for sale at the secondary marketplace or distributor 108, the gift card may be viewed and purchased by members of the general public via the online marketplace. Most gift cards are sold to purchasers as an "ecard". An ecard is a digital version of the gift card including the gift card data, i.e. card number, PIN, and issuer. A purchaser of the gift card with this data may use the gift card data to make online purchases. Some customers prefer physical delivery of the gift card, for example, so that the gift card may be physically presented in a brick and mortar store or restaurant or as a gift without requiring the customer to print the gift card data. Accordingly, the merchant may be charged a delivery fee for any cards sold as physical cards and delivered to the purchaser.

The secondary marketplace 108 receives the funds for the gift card when the gift card data is transmitted or the gift card is listed for sale at the secondary marketplace or distributor 108 or when the gift card is sold on the secondary marketplace, the card is queued for payment to the merchant or supplier who originally listed the gift card in the secondary marketplace. Funds owed to the merchant by the secondary marketplace or distributor 108 may be electronically sent via ACH, or similar transfer, to the merchant's bank account, e.g., at a set time each day.

At stage 332, the gift card purchasing device 10 or the central control server 106 receives from the secondary marketplace or distributor 108 data including a sale price of the gift card, a sale rate of the gift card, a status of the gift card, a shipping cost associated with physical delivery of the gift card, a sale date of the gift card, a commission charge associated with a sale of the gift card, and/or a net payment expected from the sale of the gift card. For example, all data associated with the sale of the gift card on the secondary marketplace 108 may be transmitted via the network 110 to the gift card purchasing device 10. The gift card purchasing device 10 and/or the central control server 106 updates the database 100 to include the sales data, and may automatically update inventory statuses based on the data. The gift card purchasing device 10 may receive the sales data through a direct system-to-system communication with the system of the secondary marketplace or distributor 108. The sales data is available for report generation at the gift card purchasing device 10. The gift card purchasing device 10 may automatically sync all data with popular financial software, e.g., QuickBooks®, Peachtree®, etc., thereby removing the need for bookkeeping.

Each gift card purchased may require physical storage. At stage 334, the gift card may be physically stored by a compartment of the gift card purchasing device. For example, the card holder 26 of the gift card purchasing device 10 may include a small, two compartment security safe located in the bottom of the housing. Each gift card from each transaction may be dropped into the security safe via a card-sized slit. In one aspect or embodiment, the card holder 26 may include a scanner that scans the gift card to ensure that the physical gift card is securely submitted to the gift card purchasing device 10 before allowing the gift card purchasing process to proceed, e.g., before allowing a payment of the purchase offer to the customer. At the end of each business day an authorized user may open the security safe, gather the cards from the day's purchases, insert them into a bag, and attach a system generated print out of the day's activity. The print out may act as the packing manifest when the cards are ready for shipment. The physical gift cards may be moved to the separate compartment on the other side of the security box for safekeeping.

Additional packing lists may be created via a shipment-creator module of the gift card purchasing device 10 where cards may be scanned via the card-reader and the gift card data automatically added to a manifest. This functionality provides merchants with the ability to ship gift cards that were not listed for sale at the point of transaction.

In one aspect or embodiment, packing lists are automatically generated by the device 10 based on predetermined ship dates and gift cards still located at the device 10 and/or merchant. Gift card data for gift cards that are pending sale to a secondary marketplace 108 and need to be exported to the secondary marketplace 108 for sale may be automatically exported by the device 10 based on predetermined conditions set by the user, e.g., a time of day the data should be transferred, how often throughout the day the data should be transmitted, and with approval or without approval by management. Data in CSV format may be exported into excel, emailed to distributors, and uploaded to the distributors' web sites for sale.

On the following business day, or at some other desired future time, the cards purchased from the previous day may be removed from the card holder 26 and prepped for shipment. The physical cards may be shipped to the appropriate location, e.g., an address associated with the secondary marketplace or distributor 108 that is listing the cards for sale or an address associated with a purchaser of the gift card on the secondary marketplace 108. Accordingly, the marketplace or distributor 108 is provided with access to the cards listed in the case of fraud, listing errors, or need for physical card delivery. The gift card purchasing process according to preferred and non-limiting embodiments thus drastically reduces and simplifies the need for the merchant to manage their inventory.

The gift card purchasing system 10 may store in the memory 16 or the database 100 a status of the card data and a status of the physical location of the gift card. The gift card purchasing device 10 may separately track when and where the gift card data has been transmitted and when and where the physical gift card has been shipped. For example, gift card data may be tracked through a "status" system. The status of the gift card data may be pending sale (in inventory), exported (sent to distributor and awaiting payment), on hold for over-the-counter-sale, fraudulent, or sold. The status of the physical gift cards may be either on site, in transit, or at distributor (secondary marketplace 108). Users of the device 10 may see the status of all of their data and inventory in real time.

At stage 336, the gift card purchasing device 10 may generate a user customizable report capable of including and being organized by an issuer of the gift card, a unique account number of the gift card, a PIN number of the gift card, a name of the customer, an address of the customer, an identification number of the customer, identifying information of the customer, a balance of the gift card, a purchase offer price of the gift card, a purchase offer rate of the gift card, a sale price of the gift card, a sale rate of the gift card, a status of the gift card, a shipping cost associated with physical delivery of the gift card, a time stamp associated with a purchase or sale of the gift card, a location of the purchase of the gift card, e.g., a device ID of a particular device 10, an employee associated with the purchase of the gift card, and/or a physical location of the gift card. The report may be displayed on display 18 or created by the voucher generator 24, e.g., as a hardcopy printout or as an email. For example, the gift card purchasing device 10 may generate daily activity reports at the end of each business day. The reports may summarize the gift card purchasing activity of the current business day. Authorized users may have the ability to customize the reports with different data fields. The reports may be stored in the memory 16 and/or the database 100.

Systems and methods according to preferred and non-limiting embodiment thus enable merchant or supplier back-end users and management to quickly sort cards by any data set and date range, and enable nearly instant creation of inventory sheets for sale to the secondary marketplace or distributors 108. The merchant or supplier may only display data that he is comfortable sharing and may generate packing lists for shipping physical gift cards to the secondary marketplace 108.

Systems and methods according to preferred and non-limiting embodiments may be configured for various business models. For example, a licensed model enables a business owner, who has been provided a device 10 by a supplier, to purchase cards and take ownership of the cards. The supplier, e.g., a supplier in control of the gift card purchasing system including the central control server 106, may collect a fee for each transaction and/or sale facilitated by the device 10. Alternatively, a corporate model enables a business owner to be paid a fee for each transaction facilitated by the device 10, while the supplier in control of the system takes ownership of the cards.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

The invention claimed is:

1. A computer-implemented method comprising:
scanning, with a card reader of a gift card purchasing device, gift card data from a physical version of a gift card offered for sale by a customer;
scanning, with the card reader, customer information from a physical version of a government issued identity document of the customer, wherein the customer information includes a government issued identification number of the customer, and wherein the customer is associated with a purchase offer rate;
associating, with the computer system of the gift card purchasing device, the gift card data with the customer information;
determining, with the computer system, a balance of the gift card based at least partly on the gift card data;
determining, with the computer system, a purchase offer for purchasing the gift card from the customer as a percentage of the balance of the gift card from the purchase offer rate associated with the customer;
receiving, with a card holder of the gift card purchasing device, the physical version of the gift card in a security safe of the card holder via a card-sized slit of the gift card purchasing device;
scanning, with a scanner of the card holder, the physical version of the gift card during receipt of the physical version of the gift card in the card holder before allowing a payment of the purchase offer to the customer;
in response to a determination that the physical gift card is securely received by the card holder, providing, with the computer system, the payment of the purchase offer to the customer; and
providing, with the computer system, at least a portion of the gift card data to a secondary marketplace.

2. The method of claim 1, wherein the gift card data comprises at least one of an issuer of the gift card, a unique account number of the gift card, and a PIN number of the gift card.

3. The method of claim 1, wherein the determining the balance of the gift card comprises accessing an external database storing the balance of the gift card.

4. The method of claim 1, wherein the determining the balance of the gift card comprises navigating to a web form and automatically populating a web form field with the gift card data.

5. The method of claim 1, wherein the determining the balance of the gift card comprises displaying, by a display, instructions to the customer associated with determining the balance of the gift card.

6. The method of claim 1, wherein the card reader comprises at least one of a magnetic strip reader, a barcode reader, and an optical character recognition (OCR) scanner.

7. The method of claim 1, wherein the customer information further comprises at least one of a name of the customer, an address of the customer, and an image of the customer.

8. The method of claim 1, further comprising:
capturing, by a biometric reader, biometric information of the customer; and
associating, with the computer system, the biometric information with the gift card data and the customer information.

9. The method of claim 1, further comprising:
receiving, with the computer system, a recommended purchase offer rate from a central control system, wherein the purchase offer is calculated based at least partly on the recommended purchase offer rate.

10. The method of claim 1, wherein the purchase offer is further calculated based at least partly on a purchase offer rate associated with an issuer of the gift card.

11. The method of claim 1, further comprising:
displaying, by a display, the purchase offer for the gift card to the customer.

12. The method of claim 1, further comprising:
receiving, with the computer system, an acceptance of the purchase offer from the customer.

13. The method of claim 12, further comprising:
generating, with the computer system, a report to the customer including at least one of a name of a party purchasing the gift card, a time stamp of the payment, at least a portion of the customer information, at least a portion of the gift card data, and the amount of the purchase offer.

14. The method of claim 12, further comprising:
storing, with the computer system, in a database at least one of a location of the payment, a time stamp of the payment, the customer information, an issuer of the gift card, the gift card data, an employee code of an employee associated with the payment, a face value of the gift card, and the amount of the purchase offer.

15. The method of claim 12, further comprising:
generating, by a label generator, a label for application to the physical version of the gift card, the label including at least one of a location of the payment, a time stamp of the payment, the customer information, an issuer of the gift card, the gift card data, an employee code of an employee associated with the payment, a face value of the gift card, and the amount of the purchase offer.

16. The method of claim 12, further comprising:
determining, with the computer system, after the payment to the customer, that the balance of the gift card has changed; and
associating, with the computer system, a fraud alert with the customer information of the customer.

17. The method of claim 1, further comprising:
receiving, with the computer system, a fraud alert for the customer from an external party; and
associating, with the computer system, the fraud alert with the customer information of the customer.

18. The method of claim 1, further comprising:
calculating, with the computer system, a sale price for selling the gift card to the secondary marketplace.

19. The method of claim 18, further comprising:
receiving, with the computer system, a recommended sale price from a central control system, wherein the sale price is calculated based at least partly on the recommended sale price.

20. The method of claim 18, wherein the sale price is calculated based at least partly on at least one of current market rates, a sale rate associated with an issuer of the gift card, a sale rate associated with an individual gift card, and sale rate associated with the secondary marketplace.

21. The method of claim 1, further comprising:
offering, with the computer system, the gift card for sale to a plurality of different secondary marketplaces;
receiving, with the computer system, a sale price from at least a portion of the plurality of different secondary marketplaces; and
selecting, with the computer system, the secondary marketplace based at least partly on the sale price received from the at least a portion of the plurality of different secondary marketplaces.

22. The method of claim 1, further comprising:
receiving, with the computer system, from the secondary marketplace, at least one of a sale price of the gift card, a sale rate of the gift card, a status of the gift card, a shipping cost associated with physical delivery of the physical version of the gift card, a sale date of the gift card, a commission charge associated with a sale of the gift card, and a net payment expected from the sale of the gift card.

23. The method of claim 1, further comprising:
generating, with the computer system, a user customizable report capable of being organized by at least one of an issuer of the gift card, a unique account number of the gift card, a PIN number of the gift card, a name of the customer, an address of the customer, government issued identification number of the customer, identifying information of the customer, a balance of the gift card, a purchase offer price of the gift card, a purchase offer rate of the gift card, a sale price of the gift card, a sale rate of the gift card, a status of the gift card, a shipping cost associated with physical delivery of the physical version of the gift card, a time stamp associated with a purchase or sale of the gift card.

24. The method of claim 1, wherein the providing the at least a portion of the gift card data to the secondary marketplace comprises navigating to a web form and automatically populating a web form field with the at least a portion of the gift card data.

25. The method of claim 1, further comprising:
storing, with the computer system, a status of the card data and a status of a physical location of the physical version of the gift card in a database.

26. A device comprising:
a card reader configured to scan gift card data from a physical version of a gift card offered for sale by a customer and to scan customer information from a physical version of a government issued identity document of the customer, wherein the customer is associated with a purchase offer rate;
one or more processors;
a computer system implemented at least in part by the one or more processors, the computer system programmed or configured to:
associate the gift card data with the customer information;
determine a balance of the gift card based at least partly on the gift card data;
determine a purchase offer for purchasing the gift card from the customer as a percentage of the balance of the gift card from the purchase offer rate associated with the customer; and
provide at least a portion of the gift card data to a secondary marketplace; and
a card holder configured to receive the physical version of the gift card in a security safe of the card holder via a card-sized slit of the gift card purchasing device, wherein the card holder includes a scanner configured to scan the physical version of the gift card during receipt of the physical version of the gift card in the card holder before allowing a payment of the purchase offer to the customer, and
wherein the computer system is further programmed or configured to provide the payment of the purchase offer to the customer in response to a determination that the physical gift card is securely received by the card holder.

27. The device of claim 26, wherein the gift card data comprises at least one of an issuer of the gift card, a unique account number of the gift card, and a PIN number of the gift card.

28. The device of claim 26, wherein the computer system is further configured to determine the balance of the gift card by accessing an external database storing the balance of the gift card.

29. The device of claim 26, wherein the computer system is further configured to determine the balance of the gift card by navigating to a web form and automatically populating a web form field with the gift card data.

30. The device of claim 26, further comprising:
a display configured to display instructions to the customer associated with determining the balance of the gift card.

31. The device of claim 26, wherein the card reader comprises at least one of a magnetic strip reader, a barcode reader, and an optical character recognition (OCR) scanner.

32. The device of claim 26, wherein the customer information comprises at least one of a name of the customer, an address of the customer, the government issued identification number of the customer, and an image of the customer.

33. The device of claim 26, further comprising:
a biometric reader configured to capture biometric information of the customer, wherein the computer system is further configured to:
associate the biometric information with the gift card data and the customer information.

34. The device of claim 26, wherein the computer system is further configured to:
receive a recommended purchase offer rate from a central control system, wherein the purchase offer is calculated based at least partly on the recommended purchase offer rate.

35. The device of claim 26, wherein the purchase offer is further calculated based at least partly on a purchase offer rate associated with an issuer of the gift card.

36. The device of claim 26, further comprising:
a display configured to display the purchase offer for the gift card to the customer.

37. The device of claim 26, wherein the computer system is further configured to:
   receive an acceptance of the purchase offer from the customer.

38. The device of claim 37, wherein the computer system is further configured to:
   generate a report to the customer including at least one of a name of a party purchasing the gift card, a time stamp of the payment, at least a portion of the customer information, at least a portion of the gift card data, and the amount of the purchase offer.

39. The device of claim 37, wherein the computer system is further configured to:
   store in a database at least one of a location of the payment, a time stamp of the payment, the customer information, an issuer of the gift card, the gift card data, an employee code of an employee associated with the payment, a face value of the gift card, and the amount of the purchase offer.

40. The device of claim 37, further comprising:
   a label generator configured to generate a label for application to the physical version of the gift card, the label including at least one of a location of the payment, a time stamp of the payment, the customer information, an issuer of the gift card, the gift card data, an employee code of an employee associated with the payment, a face value of the gift card, and the amount of the purchase offer.

41. The device of claim 37, wherein the computer system is further configured to:
   determine after the payment to the customer, that the balance of the gift card has changed; and
   associate a fraud alert with the customer information of the customer.

42. The device of claim 26, wherein the computer system is further configured to:
   receive a fraud alert for the customer from an external party; and
   associate the fraud alert with the customer information of the customer.

43. The device of claim 26, wherein the computer system is further configured to:
   calculate a sale price for selling the gift card to the secondary marketplace.

44. The device of claim 43, wherein the computer system is further configured to:
   receive a recommended sale rate from a central control system, wherein the sale price is calculated based at least partly on the recommended sale rate.

45. The device of claim 43, wherein the sale price is calculated based at least partly on at least one of current market rates, a sale rate associated with an issuer of the gift card, a sale rate associated with an individual gift card, and sale rate associated with the secondary marketplace.

46. The device of claim 26, wherein the computer system is further configured to:
   offer the gift card for sale to a plurality of different secondary marketplaces;
   receive a sale price from at least a portion of the plurality of different secondary marketplaces; and
   determine the secondary marketplace based at least partly on the sale price received from the at least a portion of the plurality of different secondary marketplaces.

47. The device of claim 26, wherein the computer system is further configured to:
   receive from the secondary marketplace, at least one of a sale price of the gift card, a sale rate of the gift card, a status of the gift card, a shipping cost associated with physical delivery of the physical version of the gift card, a sale date of the gift card, a commission charge associated with a sale of the gift card, and a net payment expected from the sale of the gift card.

48. The device of claim 26, wherein the computer system is further configured to:
   generate a user customizable report capable of being organized by at least one of an issuer of the gift card, a unique account number of the gift card, a PIN number of the gift card, a name of the customer, an address of the customer, an identification number of the customer, identifying information of the customer, a balance of the gift card, a purchase offer price of the gift card, a purchase offer rate of the gift card, a sale price of the gift card, a sale rate of the gift card, a status of the gift card, a shipping cost associated with physical delivery of physical version of the gift card, a time stamp associated with a purchase or sale of the gift card.

49. The device of claim 26, wherein the computer system is further configured to:
   navigate to a web form and automatically populate a web form field with the at least a portion of the gift card data to transmit the at least a portion of the gift card data to the secondary marketplace.

50. The device of claim 26, wherein the computer system is further configured to:
   store a status of the card data and a status of a physical location of the physical version of the gift card in a database.

* * * * *